US009417612B2

(12) United States Patent
May et al.

(10) Patent No.: US 9,417,612 B2
(45) Date of Patent: Aug. 16, 2016

(54) METHODS AND APPARATUSES FOR PROCESSING TIME ZONE IDENTIFIERS

(75) Inventors: Darrell Reginald May, Waterloo (CA); Jean-Philippe Lespinasse, Brossard (CA); Frederic Benard, Montreal (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/408,745

(22) PCT Filed: Jun. 18, 2012

(86) PCT No.: PCT/CA2012/050406
§ 371 (c)(1),
(2), (4) Date: Dec. 17, 2014

(87) PCT Pub. No.: WO2013/188945
PCT Pub. Date: Dec. 27, 2013

(65) Prior Publication Data
US 2015/0323905 A1    Nov. 12, 2015

(51) Int. Cl.
*G04G 9/00* (2006.01)
*H04L 12/58* (2006.01)
*G06Q 10/10* (2012.01)

(52) U.S. Cl.
CPC .......... *G04G 9/0076* (2013.01); *G06Q 10/109* (2013.01); *H04L 51/046* (2013.01)

(58) Field of Classification Search
CPC ... G04G 9/0076; H04L 51/046; G06Q 10/109
See application file for complete search history.

(56) References Cited

U.S. PATENT DOCUMENTS

| 5,475,717 A | 12/1995 | Cordonnier et al. |
|---|---|---|
| 5,689,688 A | 11/1997 | Strong et al. |
| 5,724,316 A * | 3/1998 | Brunts ............... G01C 21/3697 340/988 |
| 6,278,660 B1 | 8/2001 | Tognazzini |
| 6,728,533 B2 | 4/2004 | Ishii |
| 6,930,958 B2 | 8/2005 | Goergen |
| 7,916,580 B2 | 3/2011 | Nalla et al. |
| 8,467,272 B2 * | 6/2013 | Fujisawa ............... G04G 5/002 368/47 |
| 9,063,523 B2 * | 6/2015 | Akiyama ............... G04R 20/04 |
| 2005/0232086 A1 | 10/2005 | Jiddou et al. |
| 2006/0002236 A1 | 1/2006 | Punkka |
| 2007/0121425 A1 | 5/2007 | Eble et al. |
| 2007/0217291 A1 | 9/2007 | Jeong et al. |

(Continued)

FOREIGN PATENT DOCUMENTS

WO    2011085253 A2    7/2011

OTHER PUBLICATIONS

Print out of <https://addons.mozilla.org/en-US/firefox/addon/foxclocks/> showing Version 2.9.38 of Foxclocks application dated May 11, 2012.

(Continued)

*Primary Examiner* — Sean Kayes
(74) *Attorney, Agent, or Firm* — Borden Ladner Gervais LLP; Geoffrey Dekleine

(57) ABSTRACT

According to some aspects, methods and apparatuses for processing time zone IDs are provided. A time zone ID may be received at a client device. After determining that the time zone ID is unknown to the client device, the client device may transmit a request for time zone rules for the received time zone ID. The request may be transmitted to a network component such as a server. If time zone rules for the received time zone ID are available, the network component may transmit the rules to the client device.

17 Claims, 11 Drawing Sheets

(56) References Cited

U.S. PATENT DOCUMENTS

| | | |
|---|---|---|
| 2009/0131038 A1 | 5/2009 | MacNaughtan et al. |
| 2009/0193048 A1 | 7/2009 | Nalla et al. |
| 2011/0216628 A1 | 9/2011 | Nalla et al. |
| 2011/0269424 A1 | 11/2011 | Multer et al. |
| 2014/0133383 A1* | 5/2014 | Park ............ H04L 12/185 370/312 |
| 2014/0149560 A1* | 5/2014 | Hakami ............ H04L 67/1095 709/221 |
| 2014/0181256 A1* | 6/2014 | Trifa ............ H04L 67/2814 709/218 |

OTHER PUBLICATIONS

Print out of <http://docs.oracle.com/cd/E19566-01/819-4654/acaku/index.html> copyright 2010.

International Search Report for International Application No. PCT/CA2012/050406, Jun. 18, 2012.

Extended European Search Report dated Jun. 7, 2016, issued against corresponding European Patent Application No. 12879359.3.

* cited by examiner

METHODS AND APPARATUSES FOR PROCESSING TIME ZONE IDENTIFIERS

RELATED APPLICATION

The present application is a national phase entry of International PCT Application No. PCT/CA2012/050406 filed Jun. 18, 2012, the entire content of which is incorporated herein by reference.

FIELD OF THE DISCLOSURE

Aspects of the disclosure relate to communication between electronic devices. More particularly, some aspects relate to the processing of time zone identifiers that are received by a device in a communication system.

BACKGROUND

Client devices, including mobile communication devices (also referred to herein as mobile devices) or personal computers, may run on an operating system and/or use software applications that process data relating to one or more dates. For example, a device may run a calendaring application that includes the capability of maintaining a schedule of calendar events for one or more users. Calendar events may include meetings, conference calls, Internet conferences or "webinars", activities, holidays, etc. Calendar events may have a designated date or dates. Information relating to one or more dates (such as the date(s) of a calendar event) may be shared between devices. For example, a user at one client device may schedule a calendar event and send out an invitation message to one or more recipients. Recipients of the invitation who accept the invitation may then have that calendar event scheduled in their calendar, and the recipient may be considered a participant of the calendar event.

It is possible that one or more participants for a calendar event may be located in different time zones. A time zone is a region in which local time is uniformly defined. Local time may be defined, for example, by a given offset with respect to Coordinated Universal Time (UTC). The local time for one or more calendar event participants in a first time zone may be different than the local time for one or more other participants in a second time zone. Furthermore, a participant may move from one time zone to another, thereby changing the local time for that participant. Accounting for different local times for different participants may present a challenge for maintaining consistent and accurate start and end times for calendar events scheduled in a calendaring application. For example, when Daylight Savings Time (DST) is not in effect, Eastern Standard Time (EST) is five hours behind UTC and Pacific Standard Time (PST) is eight hours behind UTC. Therefore, if a first client device schedules a meeting at 3:00 pm EST and sends an invitation to a client device in the PST time zone, the PST client device may need to schedule the meeting at 12:00 pm PST.

Time zone identifiers (IDs) may be used in an electronic communication system (such as a wireless communication system) to designate time zones. A given time zone ID may correspond to a set of time zone rules that define a local time, relative to UTC, for a time zone designated by the time zone ID. The rules for a time zone may include rules that are dependent on the date. For example, DST may dictate that, during DST, the local time is offset by a certain number of minutes (e.g. one hour) for a certain portion of the calendar year with respect to the remainder of the year. The start and end dates of DST may vary from time zone to time zone. Time zone rules, such as DST rules, for a given time zone may change from time to time. By way of example, a country's government may set and change time zone rules from time to time. A government may set the dates at which DST for a particular time zone begins and ends for a given year. A new time zone ID may be created for use in a computing system when the rules for a time zone have been altered or updated, where the new time zone ID corresponds to the updated time zone rules.

BRIEF DESCRIPTION OF THE DRAWINGS

Some example embodiments will now be described in greater detail with reference to the accompanying diagrams, in which.

DETAILED DESCRIPTION

Figure 1:
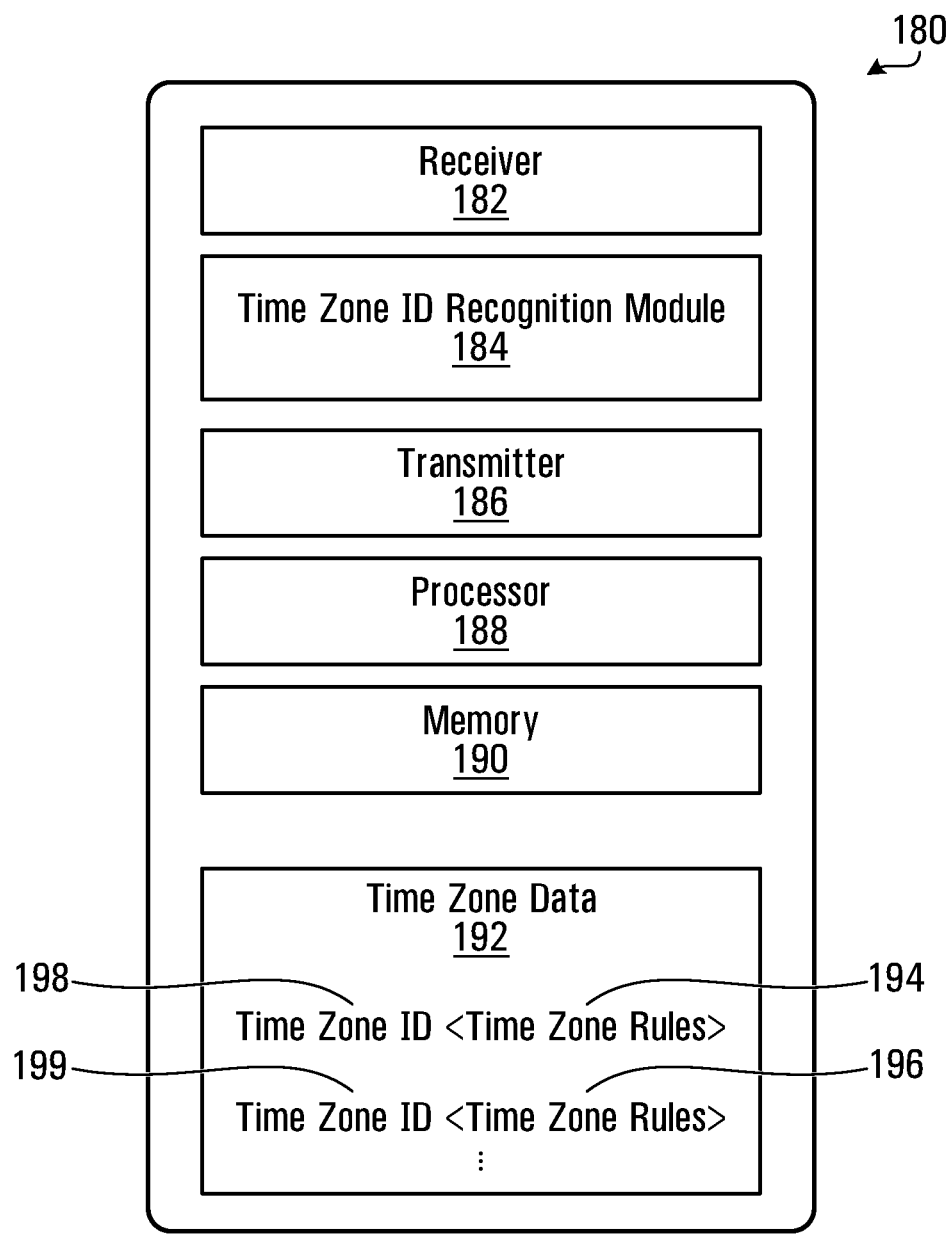
FIG. 1 is a block diagram of an example apparatus that may process time zone IDs according to some example embodiments.

According to one aspect, there is provided a method in a client device comprising: receiving a message containing a received time zone identifier; after determining that at least one time zone rule for the received time zone identifier is unknown by the client device, transmitting a request for the at least one time zone rule, wherein the at least one time zone rule defines a local time, for a time zone designated by the received time zone identifier.

In some embodiments, the at least one time zone rule defines the local time relative to Coordinated Universal Time (UTC).

In some embodiments, the method further comprises receiving the at least one time zone rule.

In some embodiments, transmitting the request for the at least one time zone rule comprises transmitting the request for receipt by a network component.

In some embodiments, the method further comprises storing time zone data, the time zone data comprising at least one time zone rule for at least one known time zone identifier.

In some embodiments, the at least one known time zone identifier comprises at least one time zone identifier in a first format, and the time zone data further comprises at least one time zone identifier mapping, each time zone identifier mapping comprising data mapping each of at least one time zone identifier in a respective second format to a respective one of the at least one time zone identifier in the first format.

In some embodiments, the at least one known time zone identifier further comprises at least one time zone identifier different than the at least one time zone identifier in a respective second format, for each time zone identifier mapping, and different than the at least one time zone identifier in the first format.

In some embodiments, the request comprises an indicator of a current version of the time zone data.

In some embodiments, the method further comprises receiving a time zone data update.

In some embodiments, receiving the time zone data update comprises receiving at least one of: the at least one time zone rule for the received time zone identifier; at least a portion of at least one time zone rule for at least one time zone identifier other than the received time zone identifier; and data to supplement or replace at least a portion of the at least one time zone identifier mapping.

In some embodiments: the time zone data comprises the at least one time zone identifier mapping; and determining that the at least one time zone rule for the received time zone identifier is unknown by the client device comprises determining that the received time zone identifier does not match any of: for each time zone identifier mapping, the at least one time zone identifier in the respective first format; and the at least one time zone identifier in the second format.

In some embodiments: the time zone data comprises the at least one time zone rule for the at least one other time zone identifier; and determining that the at least one time zone rule for the received time zone identifier is unknown by the client device further comprises determining that the received time zone identifier does not match the at least one other time zone identifier.

In some embodiments, the method comprises: receiving the at least one time zone rule for the received time zone identifier; and after receipt of the at least one time zone rule for the received time zone identifier, storing the received at least one time zone rule as part of the time zone data.

According to another aspect, there is provided a method in a network component comprising: receiving a request for at least one time zone rule for a time zone identifier; determining whether at least one time zone rule for the time zone identifier is available; and if the at least one time zone rule for the time zone identifier is available, transmitting the at least one time zone rule, wherein the at least one time zone rule defines a local time for a time zone designated by the received time zone identifier.

In some embodiments, the at least one time zone rule for the received time zone identifier defines the local time relative to Coordinated Universal Time (UTC).

In some embodiments, the method further comprises, if the at least one time zone rule is not available, transmitting the time zone identifier for receipt by a further network component.

In some embodiments, the method further comprises receiving the at least one time zone rule.

In some embodiments, the method further comprises, after receipt of the at least one time zone rule, transmitting the at least one time zone rule for receipt by a client device.

In some embodiments, the request further comprises receiving an indicator of a current version of time zone data.

In some embodiments, the method further comprises transmitting a time zone data update for receipt by the client device.

In some embodiments, the time zone data update comprises at least one of: the at least one time zone rule for the time zone identifier; at least a portion of at least one time zone rule for at least one other time zone identifier; and at least a portion of at least one time zone identifier mapping, each time zone identifier mapping comprising data mapping time zone identifiers of a respective first format to time zone identifiers of a second format, and at least one time zone rule for the second format.

In some embodiments: the request for at least one time zone rule comprises one of a plurality of requests for at least one time zone rule for the time zone identifier, each of the plurality of requests being received from a respective client devices; and transmitting the at least one time zone rule for receipt by the client device comprises transmitting the at least one time zone rule for receipt by the client devices from which the requests were received.

According to another aspect, there is provided an apparatus comprising: a receiver that receives a message containing a received time zone identifier; a processor that determines whether or not at least one time zone rule for the received time zone identifier are known to the client device; a transmitter that transmits, after determining that the at least one time zone rule are unknown by the client device, a request for the at least one time zone rule, wherein the at least one time zone rule for the received time zone identifier defines a local time for a time zone designated by the received time zone identifier.

In some embodiments, the at least one time zone rule for the received time zone identifier defines the local time relative to Coordinated Universal Time (UTC).

In some embodiments, the receiver further receives the at least one time zone rule.

In some embodiments, the apparatus further comprises a memory that stores time zone data comprising at least one of: at least one time zone identifier mapping, each time zone identifier mapping comprising data mapping time zone identifiers of a respective first format to time zone identifiers of a second format, and at least one time zone rule for the second format; and at least one time zone rule for at least one other time zone identifier, each at least one other time zone identifier being of a respective format that is different than the first or second formats.

In some embodiments, the processor compares the received time zone identifier to the time zone data to determine whether or not the at least one time zone rule for the received time zone identifier are known to the client device.

In some embodiments, the receiver receives and applies a time zone data update.

According to another aspect, there is provided an apparatus comprising a memory, and a processor configured to implement the method in the client device as described above or below.

According to another aspect, there is provided an apparatus comprising a memory, and a processor configured to implement the method in the network component as described above or below.

Other aspects and features of the present disclosure will become apparent, to those ordinarily skilled in the art, upon review of the following description of some specific example embodiments. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

Various operating systems and/or software applications may support different respective time zone identifier (ID) formats. For simplicity, an operating system or software application in an electronic device supporting a time zone ID format will simply be referred to as the device supporting the time zone ID format. For example, devices in a given communication system (such as a wireless communication system) may support the Portable Operating System Interface (POSIX) time zone ID format. Other systems may support non-POSIX formats, such as the MICROSOFT® time zone ID format or the JAVA® standard time zone ID format. Time zone IDs may include string identifiers. As an example, "America/New York" may be a time zone ID in one format, while the same time zone is identified as "Eastern Standard Time" in another format. Time zone IDs for a given format may also be stored as an integer, such as a 16-bit integer. The integer may correspond to a string identifier.

As noted above, client devices, including mobile communication devices or personal computers, may run on an operating system and/or use software applications that process data relating to one or more dates. The term "client device" includes, but is not limited to, personal computing devices, user terminals, and other similar computing devices. A client device may also be a mobile communication device. A client device may communicate with a network component. The term "network component" includes, but is not limited to, servers, base stations, base nodes, and any other component of a network that may communicate directly or indirectly with a client device. For example, communication with the network component may be through a local network, through the Internet, or over a wireless communication network. A network component may also communicate with one or more further network components and with other client devices.

A message including date information (such as a meeting invitation for an electronic calendar program) may be received by a client device that supports a particular time zone ID format. The message may include a time zone ID that is not recognized by the client device. Therefore, when processing messages including date information, time zone IDs (such as string IDs) that are not known or understood may be included with the meeting invitations. An example of how unknown time zone IDs may be encountered is explained below. As noted above, time zone rules for a given time zone may change or be updated from time to time. A first computing device operating system, such as MICROSOFT WINDOWS® operating system, may be updated to include a new time zone ID that corresponds to the updated time zone rules for the given time zone. Messages originating from devices using the first computer operating system (e.g. MICROSOFT WINDOWS operating system) may be sent to a device using a second, different, operating system (e.g. a non-MICROSOFT operating system). The second device may not support the format of the received time zone ID and/or may not have time zone rules for the received time zone ID.

According to some updating methods in a wireless communication system, the client device may wait for a system-wide update, which contains the needed time zone rules, to be pushed to the device before the client device can know how to properly handle the received time zone ID. In the meantime, dates associated with the unknown time zone ID may not be properly handled at the client device. According to some example aspects of the disclosure, a client device may proactively request time zone rules for a time zone ID that is unknown to the client device rather than waiting for a system-wide update.

FIG. 1 is a block diagram of an example apparatus 180 that may process time zone IDs according to some example embodiments. The apparatus 180 may be a client device. The apparatus 180 includes a receiver 182, a time zone ID recognition module 184, a transmitter 186, a processor 188 and a memory 190. By way of example, the apparatus 180 is shown as having access to time zone data 192 stored at the apparatus 180, for example in memory 190. In this example, the time zone data 192 includes respective time zone rules (194, 196, . . . ) for each of at least one time zone ID (198, 199, . . . ) known to the client device. (In some example embodiments, only one time zone rule may correspond to a time zone ID. Accordingly, in the example embodiments disclosed herein, "time zone rules" may refer to at least one time zone rule, or one or more time zone rules.) For example, if the client device supports POSIX time zone IDs, the time zone data 192 may include time zone rules for each POSIX time zone ID. The time zone data 192 is provided only as an example of how some time zone IDs may be known to a client device. Example embodiments are not limited to the time zone data 192 being stored at the apparatus 180. For example, the time zone data 192 may be stored at a network component (such as a server), and the apparatus 180 may receive the time zone data 192 from the network component as necessary.

Table 1 below illustrates examples of time zone rules for various example time zone IDs that may be accessible by a client device. In this example, the time zone IDs that are shown are taken from the Time Zone Database (also referred to as the "tz database", the "Internet Assigned Numbers Authority (IANA) Database" and the "Olson Database"). The corresponding time zone rules for the example time zone IDs are also shown. However, example embodiments are not limited to any particular time zone ID or time zone rule format. The time zone rules for each time zone ID in Table 1 include a base offset from UTC, a DST offset (which will be applied against the base offset), a DST start date, and a DST end date. Information regarding the Time Zone Database may be found, for example, in "Procedures for Maintaining the Time Zone Database" Internet Engineering Task Force (IETF), RFC 6557, 2012, the entire contents of which is incorporated by reference.

TABLE 1

| Time Zone ID | Base Offset from UTC (hours:minutes) | DST Offset (minutes) | DST Start Date | DST End Date |
|---|---|---|---|---|
| America/New__York | −5:00 | 60 | Mar:Sun>= 8 | Nov:Sun>=1 |
| America/Denver | −7:00 | 60 | Mar:Sun>= 8 | Nov:Sun>=1 |
| America/Regina | −6:00 | 0 | NA | NA |

In Table 1, the DST start date "Mar:Sun>=8" for America/New_York means that DST starts on the second Sunday of March (i.e. the first Sunday on or after March 8). The DST end date Nov:Sun>=1 means that DST ends on the first Sunday of November. Other DST start and end dates are possible. DST start and end dates may change from year to year. Some time zones (as shown for America/Regina in Table 1) do not follow DST.

Example embodiments are not limited to the particular types of time zone rules shown in Table 1. Additional rules may be included, and the example rules provided in Table 1 may be excluded. For example, although not shown in Table 1, DST start and end dates may change from year to year and several sets of DST rules (for different years or time periods) may be included in time zone rules for a given time zone. The format of the data in which time zone rule information is stored is not limited to any particular format, and Table 1 is provided only as an example of the information that may be reflected in time zone rules. Similarly, the specific time zone IDs shown in Table 1 are provided by way of example only and are not intended to limit the time zone IDs applicable to the example embodiments described herein.

Time zone IDs in the POSIX format may be the same time zone IDs used in the Time Zone Database (i.e. the Olson Database). Information regarding the POSIX format for time zone rules may be found in M. W. Carney, "DHCP Option for IEEE 1003.1 POSIX Timezone Specifications", Network Working Group, INTERNET-DRAFT, Sun Microsystems, Inc., Version 03, August 1997, the entire contents of which is incorporated by reference.

Further details concerning the apparatus 180, including the function of the receiver 182, the time zone ID recognition module 184, and the transmitter 186 will be discussed below. First, however, an example method for processing time zone IDs will be discussed with reference to FIG. 2.

Figure 2:
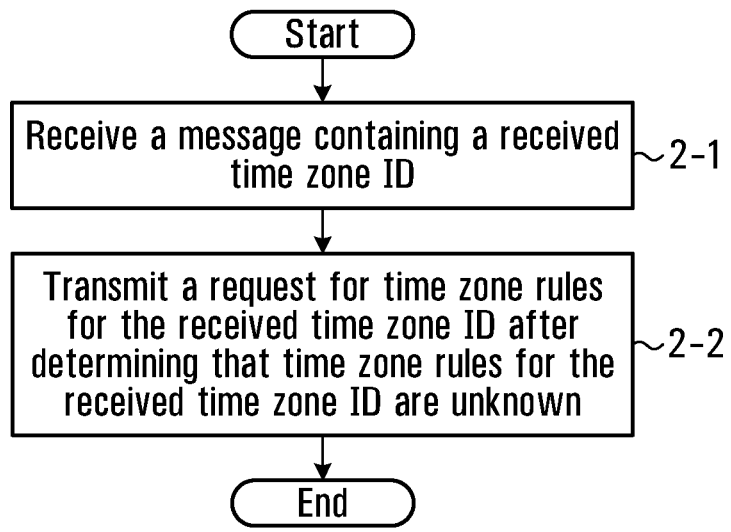
FIG. 2 is a flowchart of an example processor-implemented method in a client device for processing time zone IDs according to some example embodiments.

FIG. 2 is a flowchart of an example processor-implemented method in a client device for processing time zone IDs according to some example embodiments. At block 2-1, a message is received containing a received time zone ID. In some example embodiments, the message also includes date and/or time information. For example, the message may be an invitation message, such as a calendar event invitation message for an electronic calendaring application. In this example, the time zone rules for the received time zone ID are not known by the client device. At block 2-2, after determining that time zone rules for the received time zone ID are unknown by the client device, a request for time zone rules for the received time zone ID is transmitted. In some example embodiments, the request is transmitted for receipt by a network component, such as a server.

Time zone rules for the received time zone ID may be considered to be "known" to the client device if the client device has rules stored in memory (for example as part of time zone data 192 shown in FIG. 1), or has access to rules that can be applied as time zone rules for the received time zone ID. For example, a client device may operate in a system which supports a particular time zone ID format, such as the POSIX format. Thus, the client device, in that example, may store the time zone rules for POSIX time zone IDs and, therefore, the time zone rules for the POSIX time zone IDs are considered "known" to the device. The client device may store or have access to time zone data that provides information concerning additional time zone IDs (according to one or more non-supported formats, for example) such that the other time zone IDs are also "known" to the client device.

Turning back to FIG. 1, in some example embodiments, the apparatus 180 is configured to perform the method of FIG. 2. In particular, the receiver 182 receives a message containing a received time zone ID. The time zone ID recognition module 184 determines whether time zone rules for the received time zone ID are known by the apparatus 180. In this example, if the time zone data 192 does not include time zone rules for the received time zone ID, then the time zone ID recognition module 184 determines that the time zone rules for the received time zone ID are unknown. After the time zone ID recognition module 184 determines that time zone rules for the received time zone ID are not known by the apparatus 180, the transmitter 186 transmits a request for time zone rules for the received time zone ID. The time zone ID recognition module 184 may be implemented as a processor (such as the processor 188). The time zone ID recognition module 184 may also be implemented by a memory (such as the memory 190) and a processor (such as the processor 188), the memory containing instructions for execution by the processor, by hardware, or by a combination of instructions stored in a memory and additional hardware, to name a few examples.

Figure 3:
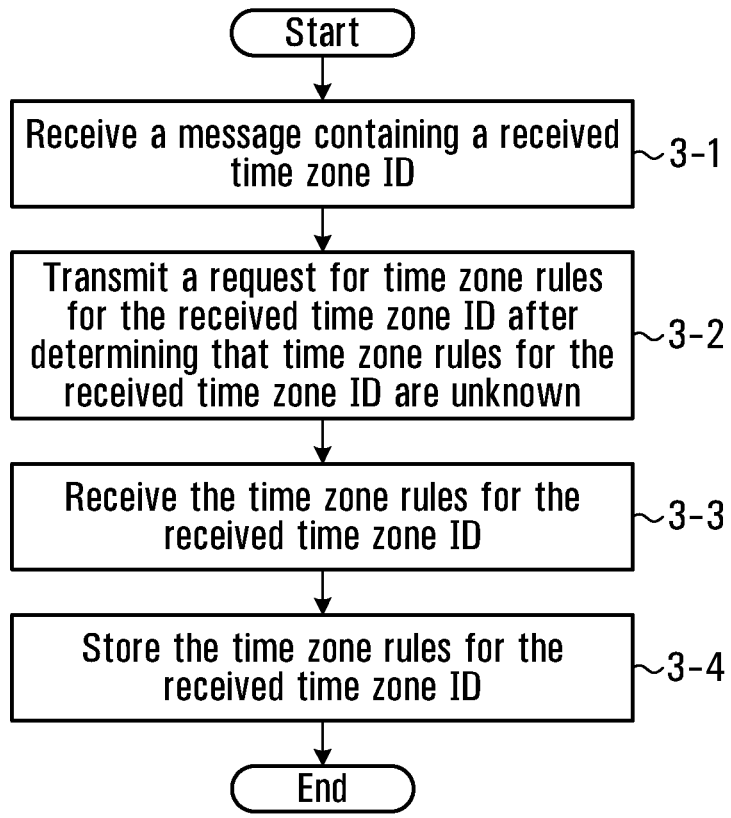
FIG. 3 is a flowchart of another example processor-implemented method in the client device for processing time zone IDs according to some example embodiments.

According to some example embodiments, the client device further receives and possibly stores the time zone rules for the received time zone ID. For example, the rules may be received from the network component. FIG. 3 is a flowchart of another example processor-implemented method in the client device for processing time zone IDs according to some example embodiments. At block 3-1, a message is received containing a received time zone ID. At block 3-2, after determining that time zone rules for the received time zone ID are unknown by the client device, a request for time zone rules for the received time zone ID is transmitted. At block 3-3, the time zone rules for the received time zone ID are received. In this example method, at block 3-4, after receipt of the time zone rules, the time zone rules are stored at the client device. For example, the time zone rules may be stored in a database, possibly as part of time zone data.

In some example embodiments, the apparatus 180 shown in FIG. 1 is configured to perform the method of FIG. 3. For example, the receiver 182 may receive the time zone rules for the received time zone ID. However, in other example embodiments, multiple receivers may be employed to perform different functions, where one receiver receives the message containing the received time zone ID and a second receiver receives the time zone rules for the received time zone ID. The apparatus 180 may further include a database for storing the received time zone rules. The database may be implemented in the memory 190, for example.

As shown in FIG. 1, time zone data including time zone rules for at least one known time zone ID may be accessible by a client device. In some example embodiments, the time zone data is stored in the client device. In some example embodiments, the at least one known time zone ID includes at least one time zone ID in a first format. For example, the first format may be a natively supported time zone ID format. In some example embodiments, determining that a received time zone ID is unknown includes determining that the received time zone ID is not any of the at least one known time zone ID (for which time zone rules are stored in the time zone data).

In some example embodiments, the time zone data further includes at least one time zone ID mapping. Each time zone ID mapping includes data mapping each of at least one time zone ID in a respective second format to a respective one of the at least one time zone ID in the first format. For example, each respective second format may be a format that is not natively supported, and the first format may be natively supported. Therefore, when a time zone ID is received that is not natively supported, but is included in a time zone ID mapping, the client device may use the rules for the supported time zone ID to which the non-supported time zone ID is mapped. In some example embodiments, if at least one time zone ID mapping is included in the time zone data, determining that a received time zone ID is unknown includes determining that the received time zone ID is not any of the at least one time zone ID in the respective second format, for each time zone ID mapping, or any of the at least one time zone ID in the first format.

Table 2 below illustrates an example of a time zone ID mapping that may be included in time zone data. The time zone ID mapping shown in Table 2 maps time zone IDs in a MICROSOFT format to time zone IDs in the POSIX format.

However, the formats and time zone IDs used in Table 2 are only shown as an example and embodiments are not limited to the time zone ID formats or to the particular time zone IDs shown in Table 2.

TABLE 2

| Time Zone ID in MICROSOFT Format | Corresponding POSIX Standard Time Zone ID |
|---|---|
| Eastern Standard Time | America/New_York |
| Atlantic Standard Time | America/Port_of_Spain |
| Central Standard Time | America/Rainy_River |
| Mountain Standard Time | America/Yellowknife |
| West Asia Standard Time | Asia/Aqtau |
| Russian Standard Time | Europe/Moscow |
| European Standard Time | Europe/Paris |

An apparatus that supports the POSIX format with access to the time zone ID mapping (similar to that shown in Table 2) may be able to properly handle time zone IDs received in the MICROSOFT time zone ID format. For example, if a MICROSOFT format time zone ID is received, the apparatus may apply the rules for the corresponding POSIX time zone ID as shown in Table 2. The examples shown in Table 2 are only a portion of the total available MICROSOFT time zone IDs and POSIX time zone IDs. In some embodiments, additional time zone IDs are included in a time zone ID mapping. For example, a time zone ID mapping may include all time zone IDs in a first format that are each mapped to a corresponding time zone ID in a second format.

Storing at least one time zone ID mapping may reduce the memory needed to address all of the time zone IDs included in the at least one mapping. More specifically, time zone rules for a single set of time zone IDs (in the first format) may be applied for multiple sets of time zone IDs (in the respective second formats). A time zone mapping may include time zone IDs in different formats than those shown in Table 2 as well. One or more time zone IDs in any first format may be mapped to one or more time zone IDs in any second format. However, it is to be understood that time zone data may not include any time zone ID mapping.

In some example embodiments, the at least one known time zone ID (for which rules are stored in the time zone data) further includes at least one time zone ID different than the at least one time zone ID in the first format. For example, if the first format is a natively supported format, then the time zone data stored at the device may also include time zone rules for additional time zone IDs that are known. The additional known time zone IDs (i.e. the at least one time zone ID different than the at least one time zone ID in the first format) may be in a format that is not natively supported. The time zone rules for additional time zone IDs may be stored in the time zone data, rather than simply including the additional time zone IDs in a time zone ID mapping, because the time zone rules for the additional time zone IDs may not properly map to other rules stored in the time zone data. For example, it may not be possible to map the rules for a given non-natively supported time zone ID to a supported time zone ID. Therefore, the actual time zone rules for the given time zone ID may be included in the time zone data.

In some example embodiments, time zone data includes a combination of: time zone rules for at least one time zone ID in a first format; at least one time zone ID mapping; and time zone rules for at least one time zone ID different than the at least one time zone ID in the first format. The at least one time zone ID different than the at least one time zone ID in the first format may also be different than the at least one time zone ID in the respective second format for each time zone ID mapping. For example, a combination of time zone ID mappings (mapping non-natively supported time zone IDs to a natively supported format) and time zone rules for additional non-natively supported time zone IDs may be stored as time zone data.

In some example embodiments, the client device first checks whether the received time zone ID is in a natively supported time zone ID format. If not, in some example embodiments, the client device then checks whether the received time zone ID is mapped to the supported format in the at least one time zone mapping included in the time zone data. If not, in some example embodiments, the client device then checks whether the time zone rules for the received time zone ID are otherwise stored in the time zone data (i.e. whether the received time zone ID matches any other time zone ID for which rules are stored). Alternatively, the client device may check the received time zone ID against all known time zone IDs for which rules are stored in the time zone data before checking the at least one time zone ID mapping.

In some example embodiments, the time zone data stored at the client device is updated from time to time. For example, time zone data updates may be pushed to the client device from a network component. A time zone data update may include data supplementing or replacing at least a portion of the time zone data stored at the client device (such as a portion of a time zone ID mapping). The network component may push an update to multiple client devices at the same time. Updates such as time zone data updates may be pushed to all client devices in a system from time to time. In some example embodiments, however, rather than requiring a system-wide update to be made every time new time zone IDs are discovered and rules for those IDs become available, client devices in the system may be dynamically updated based on which client devices have requested the time zone rules. In this way, only the devices that have requested the time zone rules for an unknown time zone ID may be provided with an update when those rules become available and a system wide push may not be required as frequently.

Figure 4:
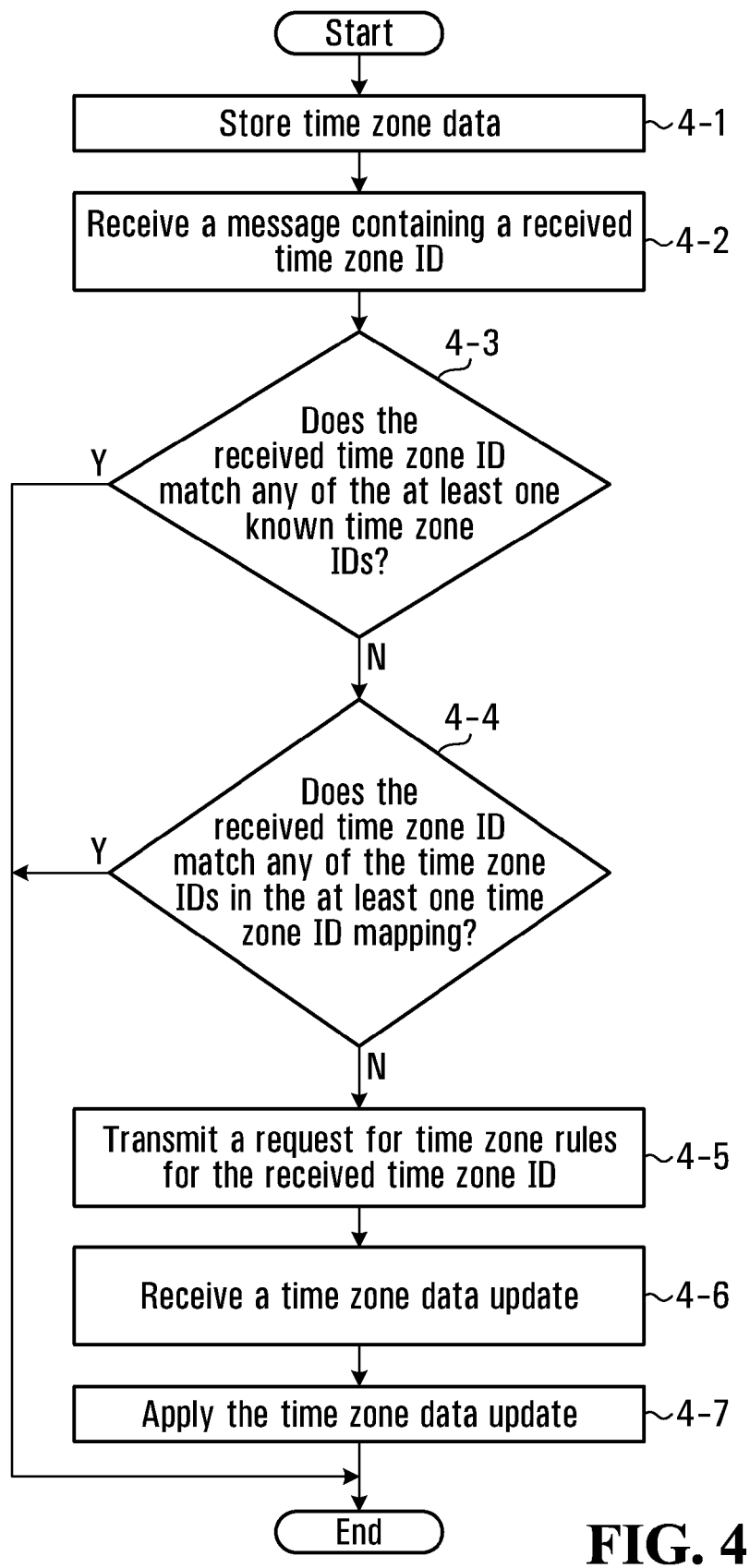
FIG. 4 is a flowchart of another example processor-implemented method in a client device for processing time zone IDs according to some example embodiments.

FIG. 4 is a flowchart of another example processor-implemented method in a client device for processing time zone IDs according to some example embodiments. At block 4-1, the client device stores time zone data. In this particular example, the time zone data includes time zone rules for a plurality of known time zone IDs. The plurality of known time zone IDs includes at least one time zone ID in a first format. The time zone data also includes at least one time zone ID mapping. Each time zone ID mapping includes data mapping at least one time zone ID in a respective second time zone ID format to at least one time zone ID in the first time zone ID format. The time zone data also includes time zone rules for at least one additional time zone ID.

At block 4-2, a message is received containing a received time zone ID. At blocks 4-3 to 4-4, the client device determines whether time zone rules for the received time zone ID are known by the client device. More particularly, in this example, at block 4-3, it is first determined whether the received time zone ID matches any of the at least one known time zone IDs for which time zone rules are included in the time zone data. If the received time zone ID is one of the at least one known time zone IDs (yes path, block 4-3), then the method shown in FIG. 4 ends, and the client device may process the known/received time zone ID using the time zone rules for the known time zone ID that are stored in the time zone data. However, after determining that the received time zone ID is not contained in the at least one known time zone ID (no path, block 4-3), then the method proceeds to block

4-4. At block 4-4, it is determined whether the received time zone ID matches any of the time zone IDs in the at least one time zone ID mapping. More particularly, in this example, it is determined whether the received time zone ID matches any of the at least one time zone ID in the respective second format, for each time zone ID mapping. If so (yes path, block 4-4), then the method shown in FIG. 4 ends, and the client device may process the received time zone ID (which is in a second time zone ID format) using rules for a corresponding time zone ID in the first format according to the time zone ID mapping. However, after determining that the received time zone ID does not match any of the at least one time zone ID in the respective second format, for each time zone ID mapping (no path, block 4-4), a request for time zone rules for the received time zone ID is transmitted for receipt by a network component at block 4-5.

In some example embodiments, blocks 4-3 and 4-4 are reversed in order. In particular, the received time zone ID may be compared to the at least one time zone ID mapping before checking whether the received time zone ID matches any known time zone ID stored in the time zone data. Example embodiments are not limited to any particular content of time zone data stored at the mobile device or to any particular method of determining that time zone rules for the received time zone ID are known or not known to the client device. In some example embodiments, the functions of blocks 4-3 and/or 4-4 may be replaced with a different method for determining whether the time zone rules for the received time zone ID are known. In some embodiments, one of blocks 4-3 and 4-4 is omitted.

In some example embodiments, the request for time zone rules for the received time zone ID includes both the received time zone ID and an indicator of a current version of the time zone data. The indicator of the current version of the time zone data may indicate a time at which the data was last updated. For example, the indicator may include a timestamp of the last time the client device performed a synchronization with a network component, where the time zone data was updated as part of the synchronization. The indicator of the current version of the time zone data may be a "timestamp" or a "high water mark" in some example embodiments. Any suitable indicator of a current version of data may be used.

At block 4-6, the client device receives a time zone data update. The time zone data update may include the time zone rules for the received time zone ID. The time zone data update may include at least a portion of time zone rules for at least one time zone ID other than the received time zone ID. For example, the at least a portion of the time zone rules for the at least one time zone ID other than the received time zone ID may include at least a portion of time zone rules for a known time zone ID for which one or more time zone rules is already stored in the time zone data. The at least a portion of time zone rules contained in the update may be an updated version of the rules. The update may only include a portion of the rules that has changed, thereby avoiding the need to send all of the time zone rules for the known time zone ID. The time zone data update may also include data to supplement or replace at least a portion of the at least one time zone ID mapping. The time zone data may also include any combination of the options set out above or additional data not specified above.

In some example embodiments, the update may include time zone data to replace all of the time zone data currently stored at the client device. Any suitable method for updating the time zone data, including time zone rules stored in the data, (e.g. adding to, replacing, or deleting a portion of the data) may be used. In the example of FIG. 4, the time zone update includes at least the time zone rules for the received time zone ID. Example embodiments are not limited to any particular update content. Additional content could be included in the update that is not described above, such as an indication of the updated version of the time zone data or other data. In other example embodiments, no update is received.

At block 4-7, the time zone data update is applied to the stored time zone data. Applying the update in this example includes storing the received time zone rules as part of the time zone data. Applying the update may also include adding further data (such as one or more time zone ID mappings or time zone rules) to the time zone data. Applying the update may also include replacing a part or all of the time zone data currently stored with new time zone data. Example embodiments are not limited to any particular method of updating data stored at a client device.

Figure 5:
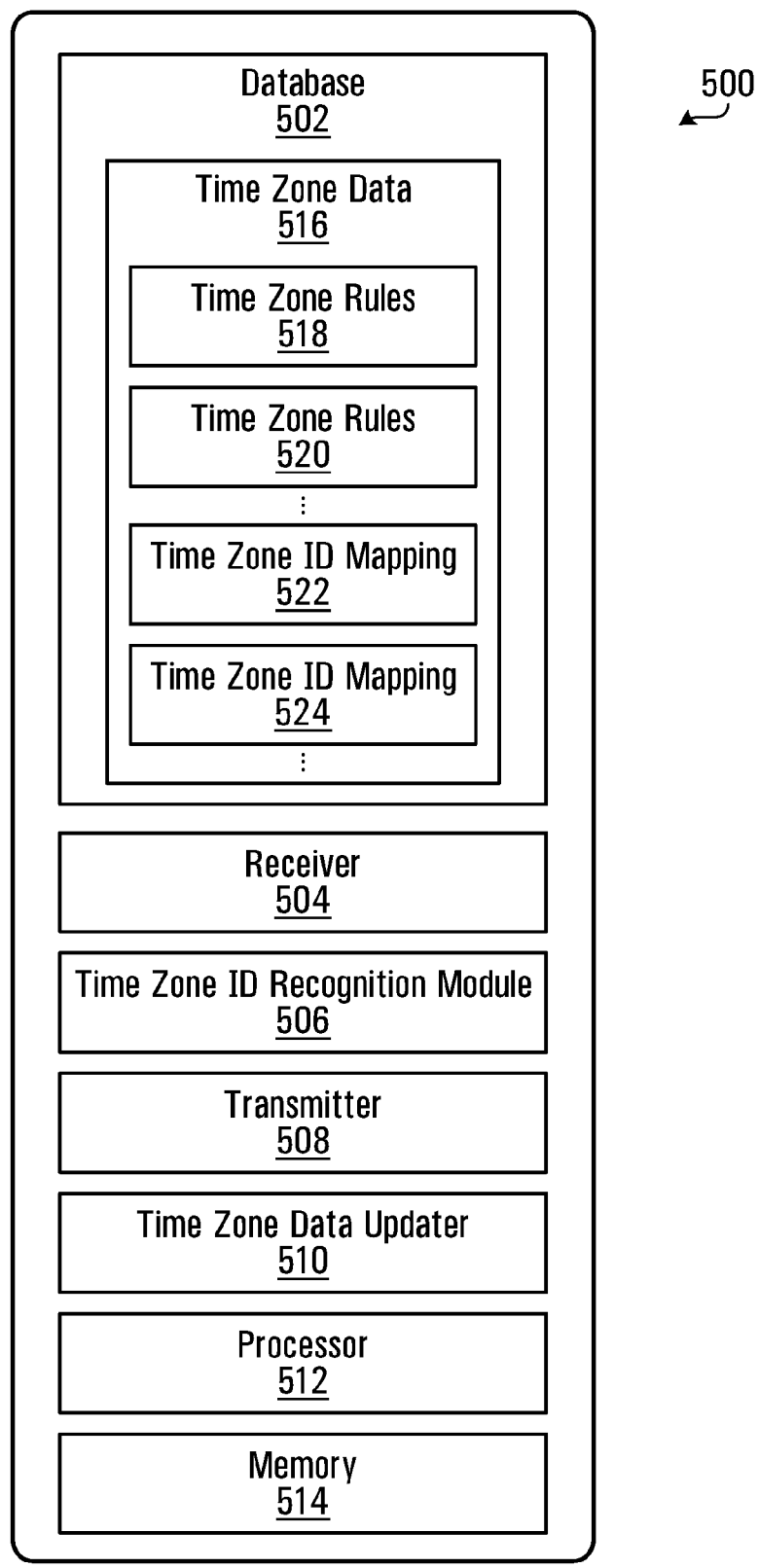
FIG. 5 is a block diagram of an example apparatus that may perform the method of FIG. 4.

FIG. 5 is a block diagram of another example apparatus 500 that may perform the method of FIG. 4. The apparatus 500 may be a client device. The apparatus 500 includes a database 502, a receiver 504, a time zone ID recognition module 506, a transmitter 508, a time zone data updater 510, a processor 512 and a memory 514. The database 502 in this example stores time zone data 516. The time zone data 516 also includes time zone rules (518, 520, . . . ) for at least one known time zone ID. The at least one known time zone ID may include at least one time zone ID in a first time zone ID format. The time zone data 516 in this example further includes at least one time zone ID mapping (522, 524, . . . ), where each time zone ID mapping maps time zone IDs in a respective second format (e.g. JAVA format or MICROSOFT format) to respective time zone IDs in the first format (e.g. POSIX format). The receiver 504 and the transmitter 508 may be similar to the receiver 182 and the transmitter 186 shown in FIG. 1. The time zone ID recognition module 506 determines whether time zone rules for the time zone ID received by the receiver 504 are known to the client device by comparing the received time zone ID to the time zone data to determine whether or not time zone rules for the received time zone ID are known to the client device. For example, the time zone ID recognition module 506 may perform the functions shown in blocks 4-3 and 4-4 of FIG. 4. If the time zone rules for the received time zone ID are unknown, then the transmitter 508 transmits a request for time zone rules for the received time zone ID for receipt by a network component, such as a server.

The receiver 504, in this example, receives a time zone data update, possibly from the network component. The time zone data updater 510 applies the update to the time zone data 516 stored in the database 502. If the time zone data update includes the time zone rules for the received time zone ID, then applying the update includes at least storing the received time zone rules for the received time zone ID as part of the time zone data 516. The time zone data updater 510 may also replace or supplement at least a portion of the time zone data 516 as part of applying the time zone data update.

The database 502 may be implemented by a memory (such as the memory 514). The time zone ID recognition module 506 and/or the time zone data updater 510 may be implemented as a processor (such as the processor 512). The time zone ID recognition module 506 and/or the time zone data updater 510 may also be implemented by a memory (such as the memory 514) and a processor (such as the processor 512), the memory containing instructions for execution by the processor, by hardware, or by a combination of instructions stored in a memory and additional hardware, to name a few examples.

In some example embodiments, in the absence of time zone rules for the received time zone ID, the client device defaults to the current device time zone. Then, when the time zone rules for the received time zone ID are received, the client device starts using the received rules.

Figure 6:
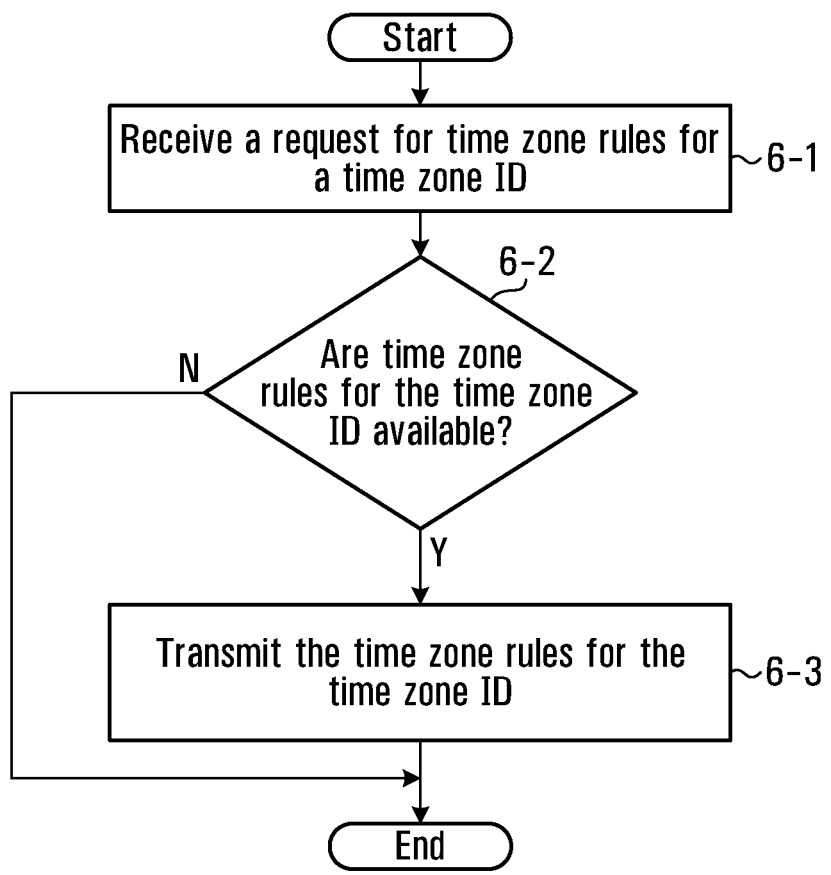
FIG. 6 is a flowchart of an example processor-implemented method in a network component for processing time zone IDs according to some example embodiments.

The methods and apparatuses discussed thus far have focused on client-side aspects. However, aspects of the disclosure also relate to methods and apparatuses on the network-side. FIG. 6 is a flowchart of an example processor-implemented method in a network component for processing time zone IDs according to some example embodiments. At block 6-1, a request for time zone rules for a time zone ID is received. The request may be received from a client device. At block 6-2, it is determined whether time zone rules for the time zone ID are available.

Time zone rules may be considered "available" if they are presently stored at the network component. The time zone rules may still be considered "available" even if they are not currently stored at the network component. For example, the time zone rules may be stored elsewhere in the system and the network component may be aware that the time zone rules may be retrieved. For example, the network component may have access (either locally or externally) to a database that indicates all available time zone rules. The network component may, after receipt of the request for the time zone rules for the time zone ID from the client device, retrieve the time zone rules from a different component in the system.

The time zone rules may be considered "unavailable" by the network component, for example, if the rules are not stored at the network component and if the network component is not aware of the time zone rules being currently available from another source. However, one skilled in the art will appreciate that the particular requirements for time zone rules to be considered "unavailable" may vary. For example, the network component may consider the time zone rules unavailable if they are not currently stored at the network and the network component may not take external sources into account for that determination. Example embodiments are not limited to any particular method for determining whether time zone rules are available.

If the time zone rules for the time zone ID are available (yes path, block 6-2), then at block 6-3 the network component transmits the time zone rules for the time zone ID. The time zone rules for the time zone ID may be transmitted for receipt by a client device. If the time zone rules for the time zone ID are not available (no path, block 6-2), then the method ends.

Figure 7:
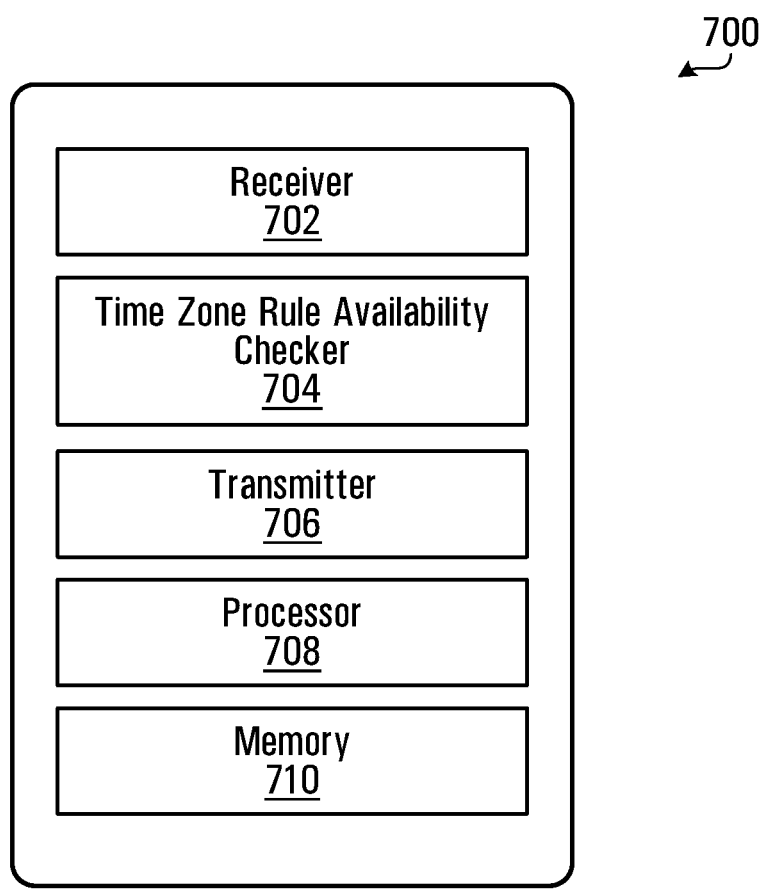
FIG. 7 is a block diagram of an example apparatus that may perform the method of FIG. 6.

FIG. 7 is a block diagram of another example apparatus 700 that may implement the method of FIG. 6. The apparatus 700 may be a network component. The apparatus 700 includes a receiver 702, a time zone rule availability checker 704, a transmitter 706, a processor 708 and a memory 710. The receiver 702 receives a request for time zone rules for a time zone ID. The receiver 702 may receive the request from a client device. The time zone rule availability checker 704 determines whether time zone rules for the time zone ID are available. If the time zone rules for the time zone ID are available, the transmitter 706 transmits the time zone rules for the time zone ID. The time zone rules may be transmitted for receipt by the client device. The time zone rule availability checker 704 may be implemented as a processor (such as the processor 708). The time zone rule availability checker 704 may be implemented as a memory (such as the memory 710) and a processor (such as the processor 708), the memory containing instructions for execution by the processor, by hardware, or by a combination of instructions stored in a memory and additional hardware, to name a few examples.

If the time zone rules are unavailable, the network component may transmit the time zone ID to a further network component (e.g. a central server) in the system. The first network component (that transmitted the time zone ID to the further network component) may then receive the time zone rules from the further network component. The further network component may be part of a support system that includes one or more support staff that may actively watch for time zone updates. For example, the support system may follow parliament sessions in other countries where time zone rules may be established or altered. The support system may also track the creation of new time zone IDs that correspond to the newly established time zone rules. The network component in communication with the client device may receive the time zone rules, either directly or indirectly, from the support system. However, even if the support system is monitoring the status of time zones around the world, it is possible that one or more new time zone IDs will be missed by the support system. By forwarding the received time zone ID to the support system when a request is received from the client device, as described above, the support system may be made aware of the time zone ID. Therefore, in accordance with some example embodiments, the support system may become aware of new time zone IDs that may have otherwise been missed by the support system.

In some example embodiments, the network component, after receipt of a request for time zone rules for a time zone ID, performs an Internet search or other electronic search for the time zone rules. This search may be performed in addition to, or instead of, transmitting the time zone ID to a further network component (such as a support system component).

Figure 8:
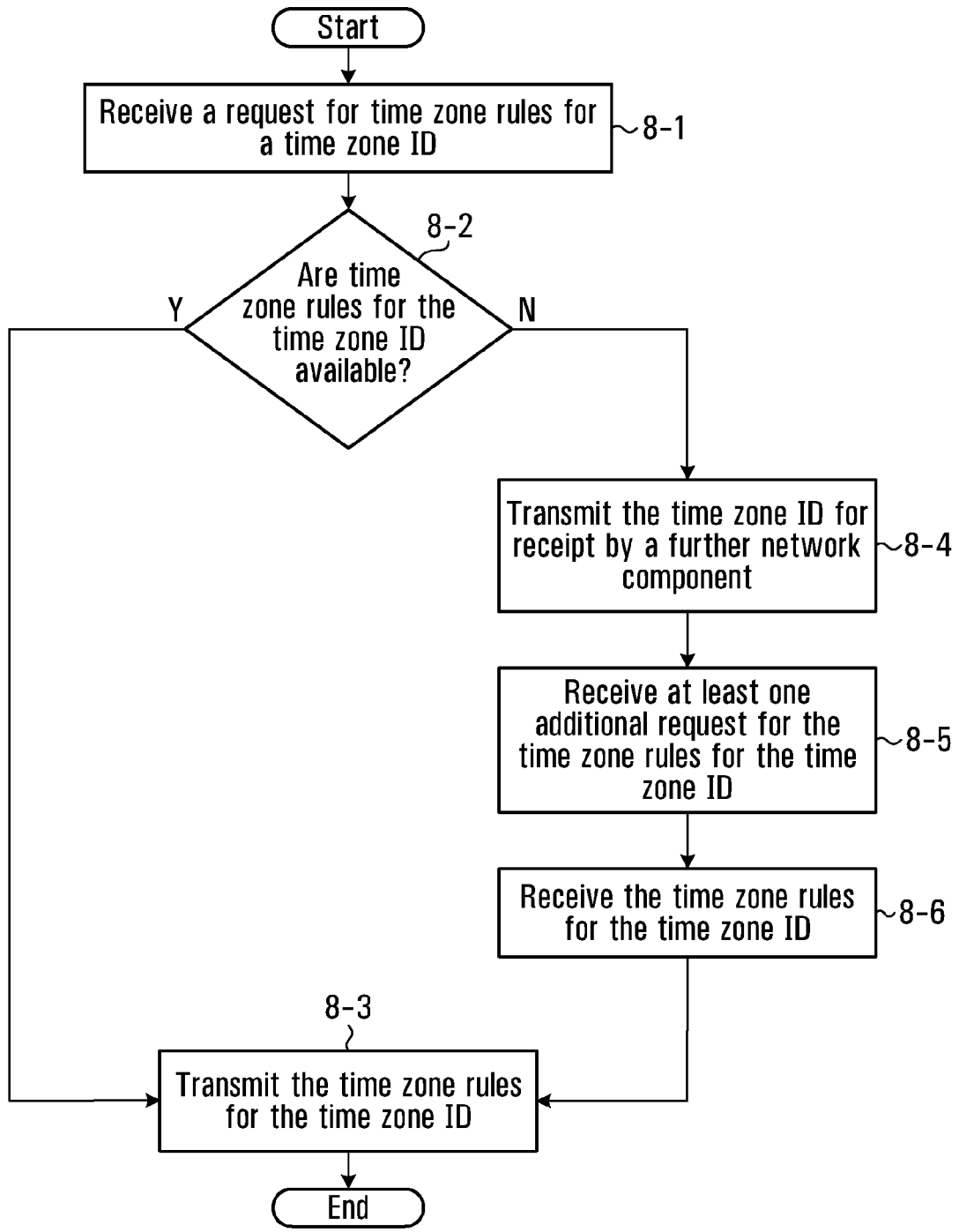
FIG. 8 is a flowchart of another example processor-implemented method in a network component for processing time zone IDs according to some example embodiments.

FIG. 8 is a flowchart of another example processor-implemented method in a network component for processing time zone IDs according to some example embodiments. At block 8-1, a request for time zone rules for a time zone ID is received. For example, the request may be received from a client device. At block 8-2, it is determined whether time zone rules for the time zone ID are available. If the time zone rules are available (yes path, block 8-2), then at block 8-3, the time zone rules are transmitted. The time zone rules may be transmitted for receipt by the client device. If the time zone rules for are not available (no path, block 8-2), then the time zone ID is transmitted for receipt by a further network component at block 8-4. In this example, the further network component is part of a support system as described above. The support system may attempt to find rules for the time zone rules for the time zone ID and, if the rules are found, the rules may be transmitted from the support system back to the original network component.

In some example embodiments, the method includes receiving multiple requests for time zone rules for the time zone ID from a plurality of client devices. For example, in the method of FIG. 8, there may be a time delay between the time that the time zone ID is sent to the support system and the time that the support system identifies time zone rules for the time zone ID. During that time delay, more requests for time zone rules may be received from other client devices. At block 8-5, at least one additional request for the time zone rules for the time zone ID is received. Thus, the request received at block 8-1 is one of a plurality of requests that are received. The plurality of requests may be transmitted from a plurality of client devices. Possibly, each request is received from a respective client device. Alternatively, two or more requests may be received from one of the plurality of client devices. Example embodiments are not limited to the number of client devices from which requests are received or to the number of requests that each client device may transmit. At block 8-6, the time zone rules are received (for example, from the support system). Then, at block 8-3, after receipt of the time zone rules, the time zone rules are transmitted for receipt by all of the plurality of client devices from which the request was received. In some example embodiments, the time zone rules for the time zone ID are transmitted to only one or more of the plurality of client devices.

In accordance with the method shown in FIG. 8, client devices that have requested time zone rules for a new time zone ID may be provided with the requested rules. Therefore, it may not be necessary to push an update including the time zone rules for that time zone ID to all client devices in the system. Rather, the time zone rules may only need to be pushed to those client devices that actually require them.

In some example embodiments, the apparatus 700 shown in FIG. 7 is configured to perform the method of FIG. 8. For example, the receiver 702 may receive a plurality of requests for the time zone rules for the time zone ID from a plurality of client devices. The transmitter 706 of the apparatus 700, in some example embodiments, further transmits the received time zone ID to a further network component if the time zone rules are determined to be unavailable by the time zone rule availability checker 704. Alternatively, instead of using the transmitter 706 to transmit the time zone ID, the apparatus 700 may include an additional transmitter (not shown) for transmitting the time zone ID. The receiver 702 may receive the time zone rules. Alternatively, an additional receiver (not shown) may be used to receive the time zone rules. Then, after receipt, the transmitter 706 may transmit the time zone rules for receipt by the client device. An example of communication between a network component, a plurality of client devices, and a further network component is shown in FIG. 9 and discussed below.

Figure 9:
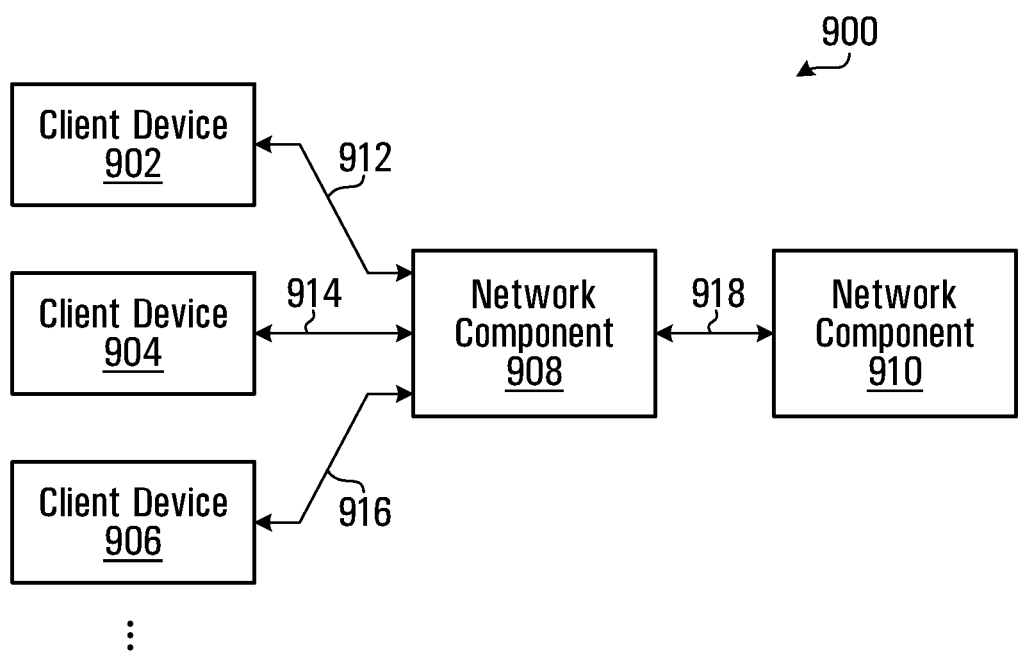
FIG. 9 is a diagram illustrating an example system according to some example embodiments.

FIG. 9 is a diagram illustrating an example system 900 according to some example embodiments. FIG. 9 shows a plurality of client devices, including client devices 902, 904 and 906, a network component 908, and a further network component 910. The network component 908 may be a server, for example. Each of the client devices 902, 904 and 906 is in communication with the network component 908 over a respective communication path 912, 914 and 916. Communication over paths 912, 914 and 916 may include, for example, communication over a local network, a wireless network, and/or through the Internet. Example embodiments are not limited to the number of client devices 902, 904 and 906 shown in FIG. 9. More or fewer client devices may be in communication with the network component 908.

The network component 908 is in communication with the further network component 910 over communication path 918. Again, communication path 918 may include a local network, a wireless network, and/or the Internet. The further network component 910 may, for example, be part of a support system and may be in communication with other elements of the system (not shown). Example embodiments are not limited to the particular system components or arrangement shown in FIG. 9. Rather, FIG. 9 is provided only as an example.

Figure 10:
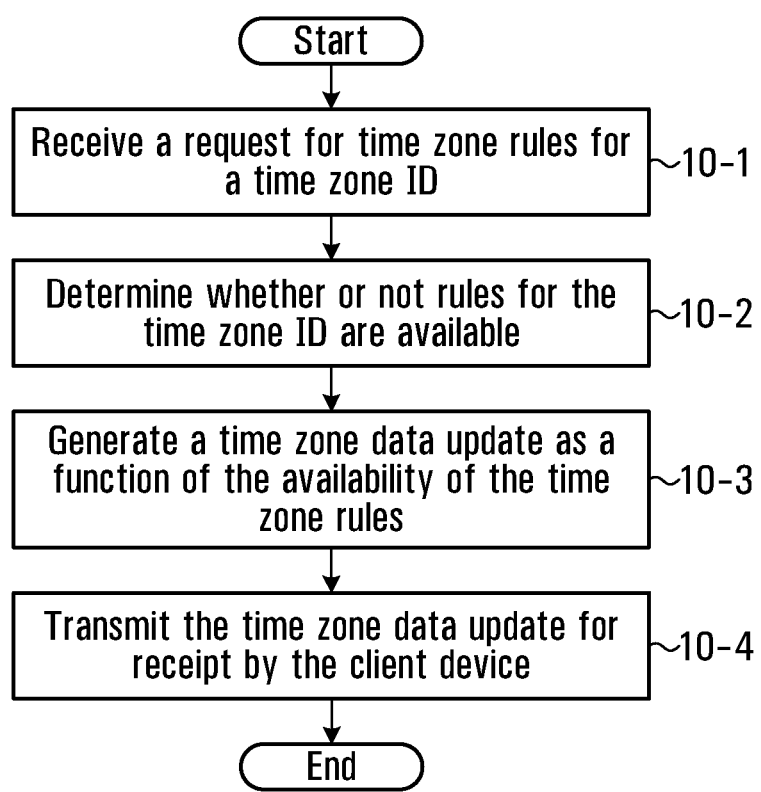
FIG. 10 is a flowchart of another example processor-implemented method for processing time zone IDs according to some example embodiments.

FIG. 10 is a flowchart of another example method for processing time zone IDs according to some example embodiments. At block 10-1, a request for time zone rules for a time zone ID is received from a client device. In some example embodiments, the request includes an indication of a current version of time zone data for the client device. As described above, the indication could be a timestamp or a high watermark that indicates a time that the time zone data for the client device was most recently updated or any other indication of the current version of the time zone data. At block 10-2, it is determined whether or not rules for the time zone ID are available. At block 10-3, a time zone data update is generated. In some example embodiments, the time zone update is generated as a function of both the availability of the time zone rules for the time zone ID and the indicator of the current version of time zone data for the client device. More particularly, the update may be generated to include information that should be added to the time zone data stored at the client device, based on the received timestamp, so that the time zone data is up to date. The time zone data update may include at least one of: 1) the time zone rules for the time zone ID; 2) at least a portion of time zone rules for at least one other time zone ID; and 3) at least a portion of at least one time zone ID mapping. The at least a portion of at least one time zone ID mapping may consist of data to supplement or replace at least one time zone mapping stored in time zone data in the client device. If the time zone rules for the time zone ID are available, then they may be included in the time zone data update. If not, then the update may be generated without including those time zone rules. At block 10-4, the time zone data update is transmitted for receipt by the client device. The time zone ID (that was included with the request received from the client device) may still be transmitted to another network component (such as a support system) and when the time zone rules for the time zone ID become available, they may be forwarded back to the client device at that time.

The time zone data update is generated as part of the method of FIG. 10. However, in other example embodiments, the method does not include generating the time zone data update. For example, the time zone data update may be requested by the network component and received from a different network component, for transmission to the client device. Example embodiments are not limited to any particular method of generating or obtaining an update to be sent to the client device. Similarly, the content of an update sent to a client device may vary. Time zone data updates are not limited to the specific example content provided herein.

In other example embodiments, no update for the time zone data is transmitted. For example, if rules are not available, there may be no update transmitted. In some example embodiments, such as the example embodiment shown in FIG. 10, the network component, after receipt of the time zone ID, transmits an update regardless of whether time zone rules are available or not. Example embodiments are also not limited to any particular method of delivering time zone rules and/or a time zone data update to a client device. The update may simply be transmitted for receipt by the client device. Alternatively, in some example embodiments, a synchronization process by which data is shared between the client device and the network component may be performed. The network component may also notify the client device that an update is available and wait for the client device to request the update. Any suitable method for transferring data and/or updating data may be used to provide the requested time zone rules and/or time zone data update to the client device.

Figure 11:
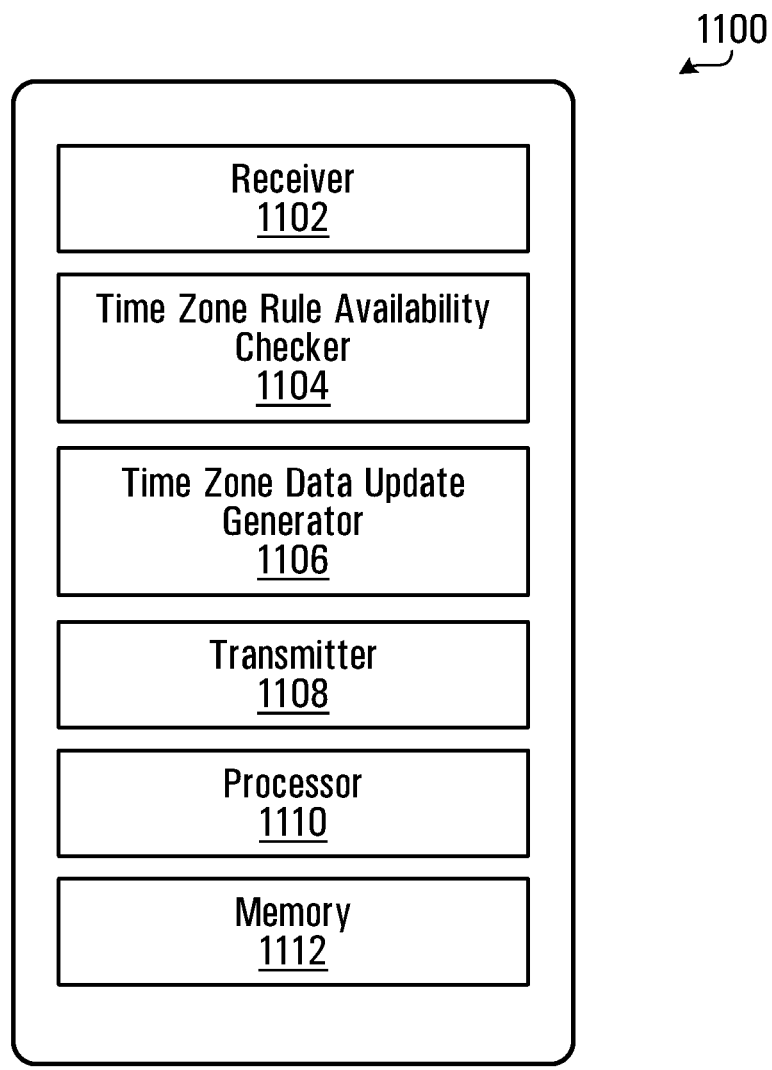
FIG. 11 is a block diagram of an example apparatus that may perform the method of FIG. 10.

FIG. 11 is a block diagram of an apparatus 1100 that may perform the method of FIG. 10. The apparatus 1100 may be a network component. The apparatus 1100 includes a receiver 1102, a time zone rule availability checker 1104, a time zone data update generator 1106, a transmitter 1108, a processor 1110 and a memory 1112. The receiver 1102, and time zone rule availability checker 1104 may be similar to the receiver 702 and time zone rule availability checker 704 of the apparatus 700 shown in FIG. 7. The time zone data update generator 1106 generates a time zone data update as a function of whether time zone rules for a time zone ID are available. The transmitter 1108 transmits the time zone transmits the time zone data update for receipt by a client device. The time zone rule availability checker 1104 and/or the time zone data update generator 1106 may be implemented as a processor (such as the processor 1110). The time zone rule availability checker 1104 and/or the time zone data update generator 1106 may be implemented as a memory (such as the memory 1112) and a processor (such as the processor 1110), the memory containing instructions for execution by hardware, or by a combination of instructions stored in a memory and additional hardware, to name a few examples.

In some example embodiments, the network component does not generate and/or transmit time zone rules and/or a time zone data update immediately after receipt of one or more requests from one or more client devices. For example, the network component may wait until a predetermined number of client devices have requested time zone rules for a particular time zone ID before providing an update to those client devices.

The method shown in FIG. 10 may further include generating and sending a time zone data update as described in FIG. 8. Similarly, the apparatus 1100 shown in FIG. 11 may include components that generate and transmit the time zone data update, similar to the apparatus 700 shown in FIG. 7.

According to some aspects, a computer-readable medium is provided having computer-executable instructions stored thereon that, when executed, cause a computer to implement any one of the methods described herein.

The methods described herein are provided as examples. The various functions of blocks of the method flowcharts shown in the Figures and described above may be performed in different orders than described above. It is to be understood that blocks of different methods that are shown in different figures may also be combined in various combinations in some example embodiments, and the methods are not limited to the specific combinations of blocks shown in each individual figure.

In some example embodiments, if the time zone rules for a time zone ID that have been requested are unavailable, then the network component transmits a message for receipt by the client device instructing the client device to use a default set of time zone rules (e.g. the rules for the current time zone of the client device). The default rules may be used temporarily by the client device until such time that the network component obtains and transmits the actual time zone rules for the time zone ID.

Figure 12:
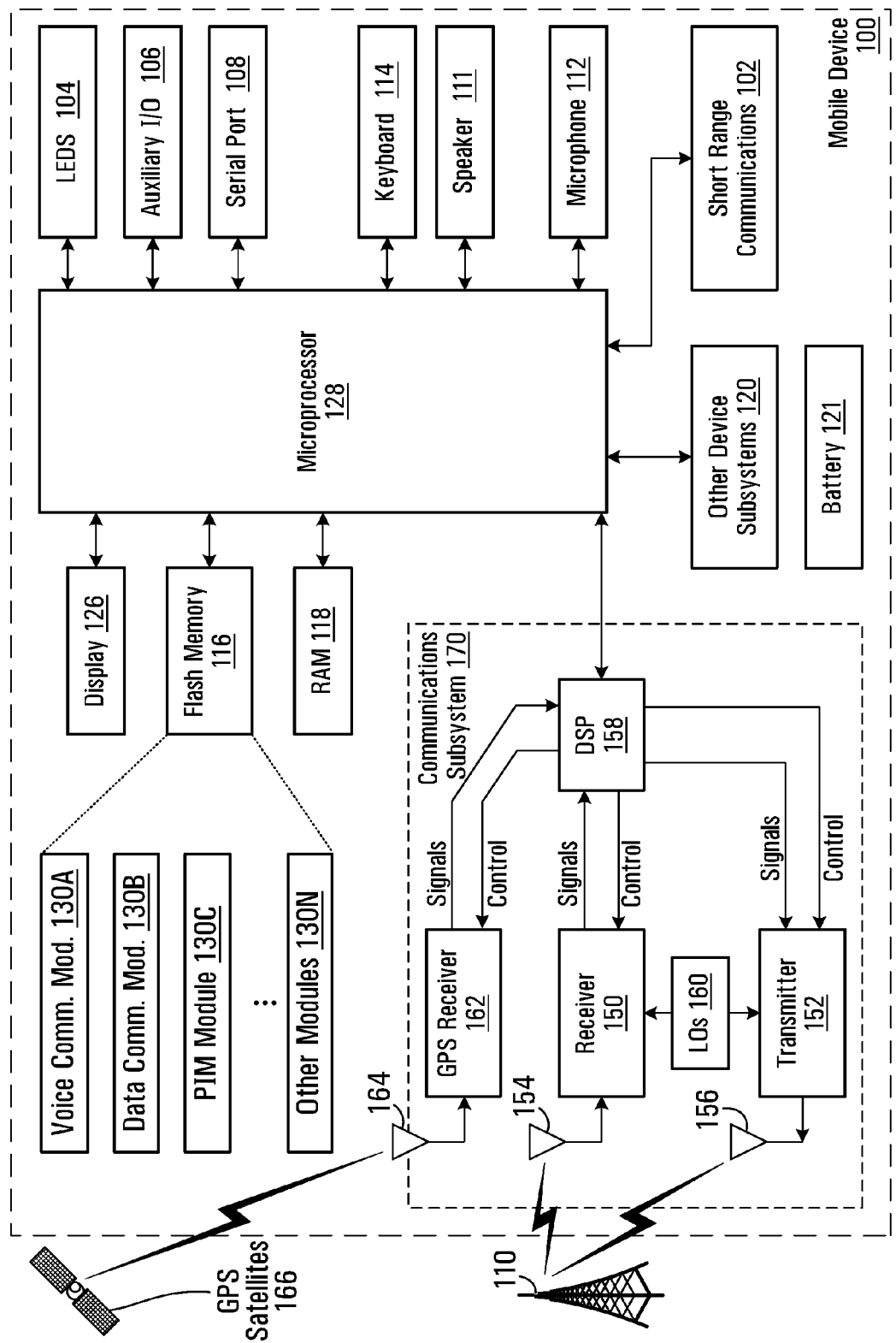
FIG. 12 is a block diagram of an example mobile device.

FIG. 12 is a block diagram of an example mobile device 100. The mobile device 100 is shown with specific components for implementing a client device and implementing features similar to those of the apparatuses 180, 500, 700 or 1100 shown in FIG. 1, 5, 7 or 11 respectively. It is to be understood that the mobile device 100 is shown with very specific details for example purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 is a type of processor with features similar to those of the processors 188, 512, 708 or 1110 of the apparatuses 180, 500, 700 or 1100 shown in FIGS. 1, 5, 7 and 11 respectively. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some example embodiments a two-way radio frequency (RF) communication device having voice and data communication capabilities. In addition, the mobile device 100 in some example embodiments has the capability to communicate with other computer systems via the Internet.

Operating system software executed by the microprocessor 128 is in some example embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some example embodiments capable of organizing and managing data items, such as e-mail, calendar events, voice mails, appointments, and task items. The PIM application is also in some example embodiments capable of sending and receiving data items via a wireless network 110. In some example embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture. The software modules may include, for example: the time zone ID recognition module 184 or 506 FIGS. 1 and 5; the time zone data updater 510 of FIG. 5; the time zone rule availability checker 704 and 1104 of FIG. 7 or 11; or the time zone data update generator 1106 of FIG. 11. Note that the implementations described with reference to FIG. 12 are very specific for example purposes. For example, alternative implementations are possible in which the information updater is not implemented as software and stored on the flash memory 116. More generally, the information updater may be implemented as software, hardware, firmware, or any appropriate combination thereof.

Communication functions, including data and voice communications, are performed through the communications subsystem 170, and possibly through the short-range communications subsystem 102. The communications subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160.

The specific design and implementation of the communications subsystem 170 is dependent upon the communication network in which the mobile device 100 is intended to operate. For example, the communications subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, or an 802.16 WiMAX network or both. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using at least one of the keyboard 114 and some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

While some specific example embodiments have been described above and illustrated in the accompanying drawings, it will be evident to those skilled in the art that modifications may be made without departing from this disclosure. Such modifications are considered as possible variants included in the scope of the disclosure.

The invention claimed is:

1. A method in a client device comprising:
   receiving a message containing a received time zone identifier;
   after determining that at least one time zone rule for the received time zone identifier is unknown by the client device, transmitting a request for the at least one time zone rule, wherein
   the at least one time zone rule defines a local time, for a time zone designated by the received time zone identifier.

2. The method of claim 1, wherein the at least one time zone rule defines the local time relative to Coordinated Universal Time (UTC).

3. The method of claim 1, further comprising receiving the at least one time zone rule.

4. The method of claim 1, wherein transmitting the request for the at least one time zone rule comprises transmitting the request for receipt by a network component.

5. The method of claim 1, further comprising storing time zone data, the time zone data comprising at least one time zone rule for at least one known time zone identifier.

6. The method of claim 5, wherein the at least one known time zone identifier comprises at least one time zone identifier in a first format, and
   the time zone data further comprises at least one time zone identifier mapping, each time zone identifier mapping comprising data mapping each of at least one time zone identifier in a respective second format to a respective one of the at least one time zone identifier in the first format.

7. The method of claim 6, wherein the at least one known time zone identifier further comprises at least one time zone identifier different than the at least one time zone identifier in a respective second format, for each time zone identifier mapping, and different than the at least one time zone identifier in the first format.

8. The method of claim 5, wherein the request comprises an indicator of a current version of the time zone data.

9. The method of claim 5, further comprising receiving a time zone data update.

10. The method of claim 9, wherein receiving the time zone data update comprises receiving at least one of:
- the at least one time zone rule for the received time zone identifier;
- at least a portion of at least one time zone rule for at least one time zone identifier other than the received time zone identifier; and
- data to supplement or replace at least a portion of the at least one time zone identifier mapping.

11. The method of claim 5, wherein:
- the time zone data comprises the at least one time zone identifier mapping; and
- determining that the at least one time zone rule for the received time zone identifier is unknown by the client device comprises determining that the received time zone identifier does not match any of: for each time zone identifier mapping, the at least one time zone identifier in the respective first format; and the at least one time zone identifier in the second format.

12. The method of claim 5, wherein:
- the time zone data comprises the at least one time zone rule for the at least one other time zone identifier; and
- determining that the at least one time zone rule for the received time zone identifier is unknown by the client device further comprises determining that the received time zone identifier does not match the at least one other time zone identifier.

13. The method of claim 5 wherein the method comprises:
- receiving the at least one time zone rule for the received time zone identifier; and
- after receipt of the at least one time zone rule for the received time zone identifier, storing the received at least one time zone rule as part of the time zone data.

14. An apparatus comprising:
- a receiver that receives a message containing a received time zone identifier;
- a processor that determines whether or not at least one time zone rule for the received time zone identifier are known to the client device;
- a transmitter that transmits, after determining that the at least one time zone rule are unknown by the client device, a request for the at least one time zone rule,
- wherein the at least one time zone rule for the received time zone identifier defines a local time for a time zone designated by the received time zone identifier.

15. The apparatus of claim 14, wherein the receiver further receives the at least one time zone rule.

16. The apparatus of claim 15, further comprising a memory that stores time zone data comprising at least one of:
- at least one time zone identifier mapping, each time zone identifier mapping comprising data mapping time zone identifiers of a respective first format to time zone identifiers of a second format, and at least one time zone rule for the second format; and
- at least one time zone rule for at least one other time zone identifier, each at least one other time zone identifier being of a respective format that is different than the first or second formats.

17. The apparatus of claim 16, wherein the processor compares the received time zone identifier to the time zone data to determine whether or not the at least one time zone rule for the received time zone identifier are known to the client device.

* * * * *